United States Patent [19]

Craig

[11] 4,172,591
[45] Oct. 30, 1979

[54] TRUNNION ASSEMBLY

[75] Inventor: Fred A. Craig, San Jose, Calif.

[73] Assignee: FMC Corporation, San Jose, Calif.

[21] Appl. No.: 881,973

[22] Filed: Feb. 27, 1978

[51] Int. Cl.² ............................................. F16F 1/16
[52] U.S. Cl. ................................... 267/154; 280/664;
280/723; 308/DIG. 11
[58] Field of Search .................. 267/57, 154; 280/664,
280/665, 695, 700, 721, 723; 308/8.2, 163, 164,
DIG. 11

[56] References Cited

U.S. PATENT DOCUMENTS

| 1,916,233 | 7/1933 | Riblet | 308/DIG. 11 |
| 3,397,897 | 8/1968 | Schultze | 267/57 |
| 3,861,765 | 1/1975 | Follert et al. | 308/8.2 |

FOREIGN PATENT DOCUMENTS 618071  8/1935  Fed. Rep. of Germany ............. 267/57

Primary Examiner—Edward R. Kazenske
Attorney, Agent, or Firm—A. J. Moore; J. F. Verhoeven

[57] ABSTRACT

The trunnion assembly includes a housing and a one-piece tubular shaft journaled within bushings secured in the housing. Thrust forces acting on the shaft in one direction are counteracted by a spacer disposed between one bushing and a hub rigidly secured to the shaft. Thrust forces acting in the opposite direction are counteracted by a multi-segmented thrust ring fitted in a groove in the shaft in position to bear against another bushing in the housing. The thrust ring is held within the groove by a retainer ring disposed between the thrust ring and an annular lip of the housing. The retaining ring, the annular lip, and a seal retainer connected to the one piece shaft by a snap ring defines a seal ring cavity having a lubricant seal ring therein that is unaffected by axial thrust acting on the shaft and prevents leakage of lubricant between the shaft and the housing at the adjacent end of the shaft. The other end portion of the shaft is sealed to the hub and housing by a conventional seal ring. One end of a torsion bar is preferably received within and splined to the one-piece tubular shaft.

3 Claims, 4 Drawing Figures

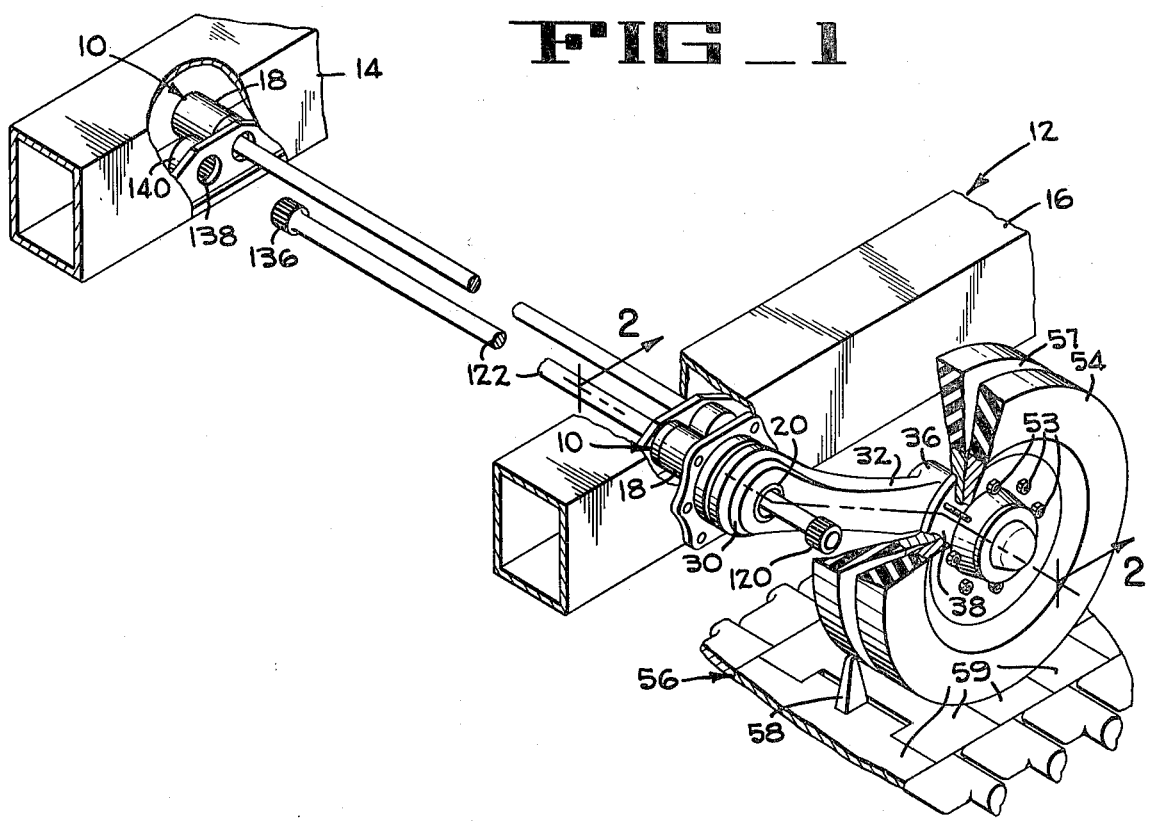
FIG_1
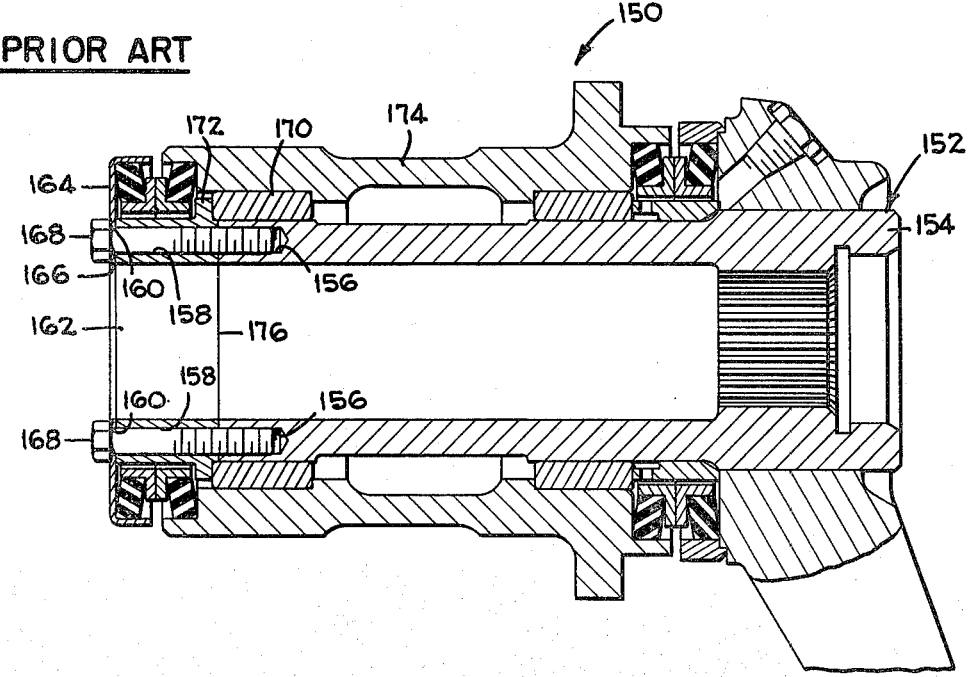
FIG_4
PRIOR ART

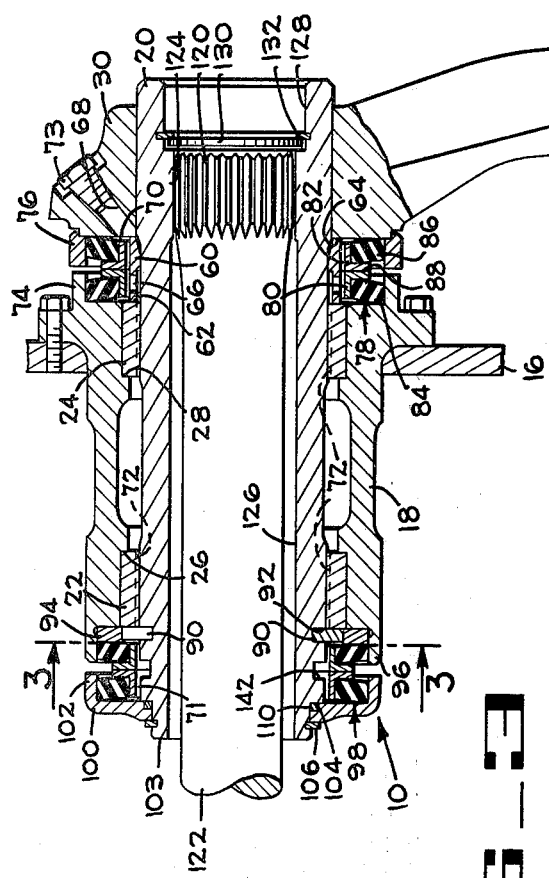
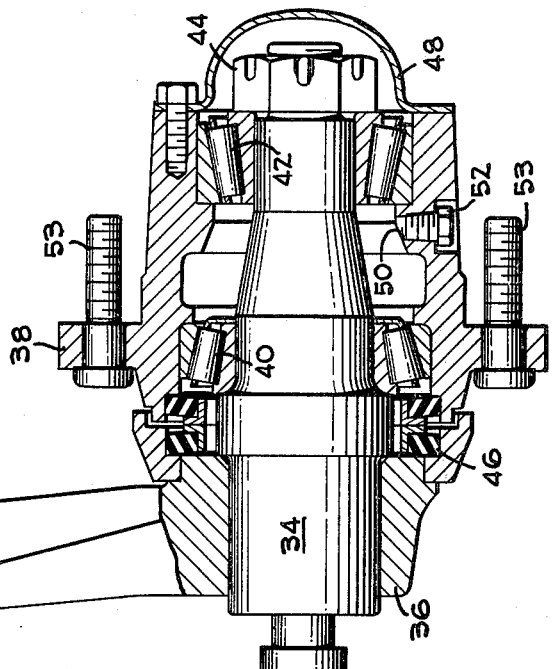
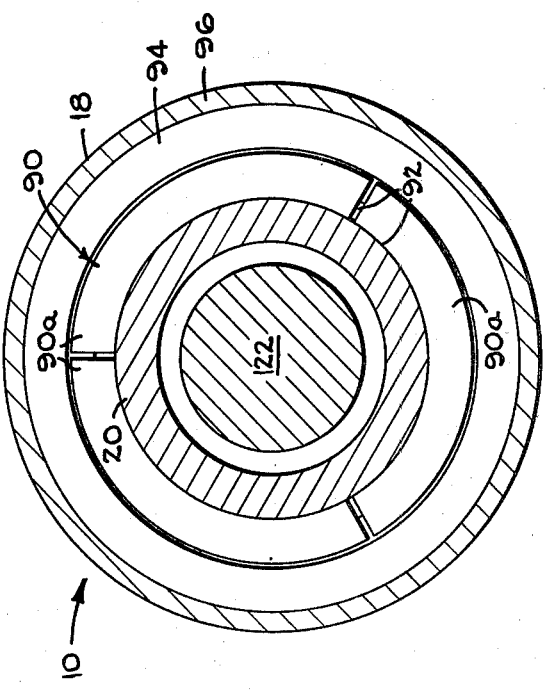

4,172,591

TRUNNION ASSEMBLY

BACKGROUND OF THE INVENTION

1. Field of the Invention

This invention pertains to an easily assembled and disassembled trunnion assembly with a reliable oil seal, and more particularly relates to a heavy duty, high thrust trunnion assembly having a one-piece tubular shaft for receiving one end of a torsion bar.

2. Description of the Prior Art

A trunnion assembly with a tubular shaft and torsion bar therein is illustrated in the drawings as "PRIOR ART", and has been used by applicant's assignee in the past for resiliently supporting road wheels that ride along the lower runs of the tracks of military and commercial tract vehicles such as log skidders or the like. The thrust forces acting on each trunnion assembly are quite severe especially when the tracks are subjected to high side loads such as occur when turning a skidder which is pulling a heavy load of logs. When turning a loaded skidder, the thrust forces cause substantial frictional wear between the thrust resisting surfaces especially when the surfaces are not properly lubricated and/or when the associated road wheel rotates through its maximum arc as would occur when the supported track moves over a large rock or log. In fact, in assignee's prior art trunnion assembly which includes a thrust flange on a shaft extension that is bolted to the inner end of a tubular trunnion shaft by 12 5/16" diameter capscrews, the thrust has been so great that on several occasions all 12 capscrews were sheared shortly after a slight amount of play occurred between the shaft extension and the adjacent end of the shaft.

Another more frequent problem with the prior art device is that wear of the bushings journaling the shaft within the housing permit the axis of the shaft to deflect relative to the axis of the housing thus localizing the thrust forces on one or several capscrews causing the capscrews to yield, shear, or loosen. Yielding, shearing or loosening of one or more of the capscrews causes lubricating oil to leak from the prior art device resulting in rapid frictional wear and failure of the trunnion assembly due to lack of lubricant.

SUMMARY OF THE INVENTION

In accordance with the present invention the trunnion assembly includes a one-piece trunnion shaft journaled in bushings secured to a trunnion housing. A spacer on the shaft is disposed between an edge of one of the bushings and a hub rigidly secured to one end of the shaft to absorb thrust and prevent axial movement of the shaft relative to the housing in one direction. A multi-segmented thrust ring fitted into an annular groove in the shaft near its other end abuts an edge of another bushing to prevent axial movement of the shaft in the other direction. The multi-segmented thrust ring is held from radial movement out of the groove by a retainer ring. A first seal ring cavity is partially formed by annular lips on the hub and on the adjacent end of the housing, while a second seal ring cavity is partially formed by annular lips on the other end of the housing and on a retainer cap that is secured to the shaft by a snap ring. A dual function seal is positioned in each seal cavity and accordingly retains lubricant oil between the shaft and the housing without being adversely affected by thrust forces acting on the assembly.

In the preferred embodiment of the invention the trunnion shaft is a tubular shaft having one end of a torsion bar operatively connected thereto. The use of the multi-segmented thrust washer also permits using the same trunnion housing for shafts of several different outside diameters by merely providing bushings having corresponding inside diameters. The shaft, bushings, and thrust resisting surfaces are preferably hardened.

BRIEF DESCRIPTION OF THE DRAWINGS

FIG. 1 is a partially exploded fragmentary perspective with parts cut away illustrating the trunnion assembly of the present invention in its preferred tracked vehicle supporting environment.

FIG. 2 is an enlarged section taken substantially along lines 2—2 of FIG. 1 with the wheel being removed and with the torsion bar being in operative position, said view illustrating the means for preventing axial movement of the shaft relative to the trunnion housing.

FIG. 3 is a section taken along lines 3—3 of FIG. 2.

FIG. 4 is a section of assignee's prior art trunnion assembly provided as an aid for explaining the problems inherent in the prior art device and the advancement to the art by the trunnion assembly of the present invention.

DESCRIPTION OF THE PREFERRED EMBODIMENT

The trunnion assembly 10 (FIGS. 1 and 2) of the present invention is illustrated as a component of a tracked vehicle 12 having a chassis that includes a pair of parallel longitudinally extending box frame members 14 and 16. It will be understood that a plurality of assemblies 10 are bolted to each frame member 14 and 16 even though only one complete assembly is illustrated in the drawings.

Each assembly 10 includes a trunnion housing 18, with the illustrated assembly being bolted to the frame member 16. A one-piece trunnion shaft 20 (FIG. 2), which is preferably a tubular shaft, is journaled in the bushings 22 and 24 which are press fitted in the housing against housing shoulders 26 and 28 that prevent axial movement of the bushings. An upper hub 30 on one end of a road arm 32 is rigidly secured to the shaft 20. A wheel spindle 34 is press fitted in a lower hub 36 on the other end of the road arm 32 and has its axis parallel to the axis of the shaft 20.

A wheel hub 38 is journaled on the spindle 34 by bearings 40,42 and is held from axial movement by a nut 44 screwed on the spindle and locked in place in the usual manner. A seal ring 46 at one end of the wheel hub 38, and a hub cap 48 bolted to the free end of the wheel hub prevents dirt and debris from contaminating lubricating oil which is introduced into the hub 38 through a port 50 that is closed by a plug 52. A dual road wheel 54 (FIG. 1) is connected to the wheel hub 38 by lug bolts 53 with the wheel 54 being resiliently urged against the associated track 56 (only one being shown) as will be described hereinafter. It will be noted that the road wheel 54 is provided with a central annular groove 57 which receives tongues 58 on each shoe 59 of the track 56. Thus the tongues 58 transmit large side loads acting on the tracks to the trunnion assembly 10.

An important feature of the invention is the manner in which the one-piece trunnion shaft 20 (FIG. 2) is mounted within the trunnion housing 18 for preventing relative axial movement between the shaft and the body during normal operation, but which permits easy and rapid disassembly of the shaft 20 from the housing 18 when replacement or repairs are required. It will be understood, however, that in the illustrated embodiment the road wheel 54 (FIG. 1) must be removed from the spindle 34 and the trunnion assembly 10 must then be removed from its associated frame member 16 before the trunnion assembly is disassembled because the inner portion of the trunnion housing is preferably disposed within the associated box frame member 16.

As illustrated in FIG. 2, the one-piece tubular trunnion shaft 20 is prevented from movement toward the left by a spacer ring 60 that is disposed between and is in abutting engagement between one edge 62 of the bushing 24 and a shoulder 64 of the upper road arm hub 30. A plurality of lubrication passages 66 are provided in a reduced thickness portion of the spacer ring 60 to permit lubricant to be directed between the trunnion shaft 20 and bushings 24. The lubricant, which is preferably oil, is directed through a port 68 in the hub 30 into a seal ring cavity 70, through the hole 66 to an through the interfaces of the shaft 20 and bushings 22 and 24, and thereafter into a second seal ring cavity 71 at the inner end of the assembly. In the preferred embodiment, several shallow slots 72 are provided in the face of the bushings 22,24 to aid in the flow of lubricating oil within the assembly. The port 68 is later closed by a plug 73. The seal ring cavity 70 is partially defined by an annular lip 74 on the trunnion housing 18, and an annular lip 76 rigidly secured as by welding to the upper road arm hub 30. A double function annular seal ring 78 of well known design is fitted within the cavity 70 and is spaced from the spacer ring 60 for reasons to be described hereinafter.

The seal ring 78 includes a pair of hardened metal rings 80,82 each receiving the inner circumferential sealing surfaces of flexible resilient annuluses 84,86 of rubber or the like. The outer surfaces of the rubber annuluses are seated in corners of the stationary and rotatable portions of the cavity 20 and resiliently urge the metal rings 80-82 together with sufficient force to provide a fluid seal at their interface 88.

A multi-segmented thrust ring 90 (FIGS. 2 and 3), with three segments 90a being the preferred number of segments, is fitted in an annular groove 92 formed in the trunnion shaft 20 and is locked from radial movement out of the groove by a retaining ring 94, which retaining ring is preferably a solid ring. An annular lip 96 of the inner seal ring cavity 71 serves the dual purpose of encompassing both the retaining ring 94 and a portion of a second conventional double function annular seal ring 98. A seal retainer 100 includes an annular lip 102 which encompasses the other portion of the seal ring 98. The seal retainer 100 is mounted on a reduced diameter portion 103 of the trunnion shaft 20 and is held from axial movement by a shoulder 104 on the shaft and a snap ring 106 fitted in an annular groove formed in the shaft 20 immediately adjacent its inner end. A packing ring 110 prevents escape of the previously mentioned lubricating oil which enters the second cavity 71 and lubricates the seal ring 98.

Another feature of the invention is that the multi-segment thrust ring 90 and retaining ring 94 permits the use of the same size trunnion housing 18 for shafts of different outside diameters (as well as inside diameters) provided the diameter of the groove 92 remains the same for all shafts. If a trunnion shaft 20 of larger diameter than that illustrated is used, the inside diameter of the bushings 22 and 24 and spacer ring 60 are correspondingly increased. If the diameter of the shaft 20 is decreased, the inside diameter of the spacer ring 60, and the bushings 22 and 24 are decreased.

The diameter of the groove 92 and the reduced diameter portion 103 of the trunnion shaft 20 are preferably the same for all shaft diameters so that the same size multi-segmented locking rings 90 and seal retainers 100 can be used for all sizes of trunnion shafts. It will be understood, however, that different size locking rings and retainers may be used if it is found desirable to change the diameter of the groove 92 and shaft portion 103. Such a condition may occur if the shaft 20 is much smaller in diameter than that illustrated in FIG. 2.

When the trunnion assembly 10 is used in the tracked vehicle environment illustrated in FIG. 1, the shaft 20 is tubular and one splined end 120 of a torsion bar 122 is received within mating splines 124 formed in the shaft 20 adjacent its outer end. The inner portion 126 of the shaft 20 is bored to a larger diameter than the splined portion 124, and a counterbore 128 of larger diameter than said spline portion 124 is provided outwardly of the splines. An abutment disc 130 is locked in the counterbore 128 by a snap ring 132 fitted in a groove in the counterbore to limit movement of the torsion bar to the right (FIG. 2). The other splined end 136 (FIG. 1) of the torsion bar 122 is anchored in a complementary splined portion 138 of an anchor bracket 140 that is rigidly secured to the chassis frame member 14.

During normal operation of the trunnion assembly when used in the illustrated tracked vehicle environment, the components of the assembly are first assembled as illustrated in FIGS. 1 and 2. Since the resilient rings 84,86 of the seal 78 must be axially compressed during assembly, an annular groove 142 is formed in the shaft 20 permitting the end of a screw driver or pry bar to engage the shaft and pry the shaft to the left relative to the housing 18 permitting easy insertion of the multi-segmented ring 90 into its groove 92. After the retainer ring 94 has been put in place around the multi-segmented ring, the seal retainer 100 is pushed on the shaft 18 to compress resilient rings of the seal 98 and is thereafter locked in place by the snap ring 106.

When the vehicle drives over uneven soil, the torsion bar 122 will permit the trunnion shaft 20 to pivot about its axis within the trunnion housing 18 in accordance with the varying load applied to the associated road wheel 54. Inward axial movement of the one-piece trunnion shaft 20 relative to the housing 18 due to thrust loads is prevented by the spacer 60 which is disposed in abutting engagement between one edge of the bushing 24 and the shoulder 64 of the upper road arm hub 30.

In order to prevent outward axial movement (to the right in FIGS. 1 and 2) of the shaft 20 within the trunnion housing 18 due to large side forces which occur when making turns or the like, the multi-segmented thrust ring 90 bears against the bushing 22. Since the multi-segmented thrust ring 90 is locked within the groove 92 in the one-piece trunnion shaft 20 all of the axial thrust acting on the shaft is transmitted through the ring directly against the bushing 26 thus eliminating the application of thrust forces to connecting members such as bolts or the like. The use of the multi-segmented thrust ring 90 also eliminates oil leaks due to thrust and frictional forces loosening joints in two-piece shafts as frequently occurred in applicant's prior art trunnion assembly.

In order to more easily understand the advantages of the trunnion assembly 10 of the present invention, a comparison of the assembly 10 with assignee's prior art trunnion assembly 150 as illustrated in FIG. 4 will follow:

The prior art trunnion assembly 150 (FIG. 4) is similar to the trunnion assembly 10 with the primary difference being that a two-piece tubular trunnion shaft 152, not a one-piece shaft, is used. The outer elongated section 154 of the tubular shaft 152 has a plurality of threaded holes 156 in its inner end, with 12 holes being the preferred number. The holes register with an equal number of holes 158,160 in a thrust resisting inner section 162 of the two-piece shaft 152 and in a seal ring cap 164, respectively. The cap 164 is centrally apertured at 166 to receive a torsion bar (not shown). Capscrews 168 firmly tighten the seal ring cap 164 and the thrust resisting inner section 162 of the shaft to the elongated shaft section 154.

It will be noted that axial forces applied to the shaft toward the right (FIG. 4) is resisted by one edge of a bushing 170 that is engaged by a thrust flange 172 of the inner section 162 of the two-piece shaft 152. The bushing 170 is rigidly secured to the housing 174 of the assembly 150. Since the inner section 162 of the shaft is bolted to the outer section, it has been determined that repeated thrust forces acting upon the shaft toward the right (FIG. 4) will cause one or more capscrews to loosen, yield, or break causing oil to leak through the interface 176 between the two shaft sections. If the trunnion assembly 150 is operated without lubricant, it will be appreciated that failure will occur quite rapidly even though the relatively rotating parts of the prior art device are hardened.

From the foregoing description it is apparent that the trunnion assembly of the present invention comprises a one-piece tubular shaft that is held from axial movement out of the trunnion housing by a multi-segmented thrust ring fitted within a slot in the shaft thereby providing axial loads acting on the shaft from being applied to the oil seal rings and also eliminating the possibility of oil leaking from joints in the shaft since no such joints are present.

Although the best mode contemplated for carrying out the present invention has been herein shown and described, it will be apparent that modification and variation may be made without departing from what is regarded to be the subject matter of the invention.

I claim:

1. In a trunnion assembly which includes a housing, bearing means in said housing held from axial movement relative thereto, a one-piece shaft journaled in said bearing means, means rigidly secured to one end of said shaft for applying rotative and axial forces to said shaft, first thrust resisting means for resisting axial movement of the shaft relative to the housing in one direction: the improvement which comprises a second thrust resisting means including a multi-segmented thrust ring having an inner peripheral portion and an outer peripheral portion, means defining an annular groove in said shaft for seating the inner peripheral portion of said multi-segmented ring with the outer portion slidably engaging one of said bearing means for resisting axial movement of the shaft relative to the housing in the other direction, and a retaining ring encompassing said multi-segmented thrust ring for maintaining the inner portion of said multi-segmented ring within said groove; first seal means near one end of said housing defining a lubricant seal between said shaft and said one end of said housing; second seal means near the other end of said housing for defining a lubricant seal between said shaft and said other end of said housing; said second seal means including an annular lip on said other end of said housing, a seal retainer secured in fluid tight engagement to said shaft and having an annular lip directed inwardly toward said housing lip, and a seal ring including a pair of resilient annuluses disposed within and establishing sealing engagement with said lips; means for directing a lubricant between said housing and said shaft; said housing lip encompassing said retaining ring and one of said resilient annuluses engaging and maintaining the retaining ring in locked position surrounding the multi-segmented thrust ring.

2. An apparatus according to claim 1 wherein said shaft is a tubular shaft.

3. An apparatus according to claim 2 wherein said tubular shaft includes an internally splined end portion, and additionally comprising a torsion bar having one end anchored from rotation and the other end portion extending into and anchored to the splined portion of said shaft.

* * * * *

UNITED STATES PATENT OFFICE
CERTIFICATE OF CORRECTION

Patent No. 4,172,591    Dated October 30, 1979

Inventor(s) FRED A. CRAIG

It is certified that error appears in the above-identified patent and that said Letters Patent are hereby corrected as shown below:

Col. 1, line 17 - change "tract" to --track--.

Signed and Sealed this

Twenty-second Day of January 1980

[SEAL]

Attest:

SIDNEY A. DIAMOND

Attesting Officer    Commissioner of Patents and Trademarks